United States Patent [19]

Wagner et al.

[11] Patent Number: 4,676,815
[45] Date of Patent: Jun. 30, 1987

[54] APPARATUS FOR THE PRODUCTION OF FINE MINERAL FIBERS

[75] Inventors: Wolfram Wagner; Peter R. Nyssen, both of Dormagen; Günter Espanion; Dirk Berkenhaus, both of Cologne; Günter Haladuda, Burscheid; Hans-Theo van Pey, Lipp; Karl-Heinz Schott, Dormagen, all of Fed. Rep. of Germany

[73] Assignee: Bayer Aktiengesellschaft, Leverkusen, Fed. Rep. of Germany

[21] Appl. No.: 847,797

[22] Filed: Apr. 3, 1986

[30] Foreign Application Priority Data

Apr. 27, 1985 [DE] Fed. Rep. of Germany ....... 3515346

[51] Int. Cl.$^4$ ............................................. C03B 37/06
[52] U.S. Cl. .......................................... 65/16; 264/12; 425/7
[58] Field of Search ............................ 65/7, 9, 16, 4.4; 264/12; 425/7, 80.1

[56] References Cited

U.S. PATENT DOCUMENTS 3,352,653 11/1967 Speth .................................... 65/16 X
3,547,610 12/1970 Holman ..................................... 65/7
4,553,996 11/1985 Muschelknautz et al. ............. 65/4.4

Primary Examiner—Robert L. Lindsay
Attorney, Agent, or Firm—Sprung, Horn, Kramer & Woods

[57] ABSTRACT

Filaments of a molten material issue from a plurality of openings in a heated melt crucible and are further fiberized in a draw nozzle by means of a blowing medium. The diameter of the outlet openings (3) at the base of the melt crucible (1) is very small and is 0.2 to 1.5 mm, so that very fine primary filaments (12) are already formed at this point. These primary filaments are grasped by a very turbulent current at the entrance of the draw nozzle (5). The transverse component of the current decreasing in favor of the longitudinal component as the axial distance from the outlet openings (3) increases. The draw nozzle also has an inlet portion, which has a sharp outer edge and widens in the direction of flow, so that air blows against the primary filaments at a high speed and they are exposed to a strong pressure gradient in the longitudinal direction before entering the inlet portion. In the draw nozzle the primary filaments which are themselves already very thin are drawn out further until they have the required final diameter. For this purpose a zone is provided in the interior of the nozzle, following the inlet portion, in which zone the rate of flow of the blowing medium is 400 m/s to 600 m/s at a pressure of between 0.1 and 0.4 bar. By means of this device very fine mineral fibers with a substantially uniform fiber diameter of between 0.1 μm and 5 μm can be produced.

8 Claims, 9 Drawing Figures

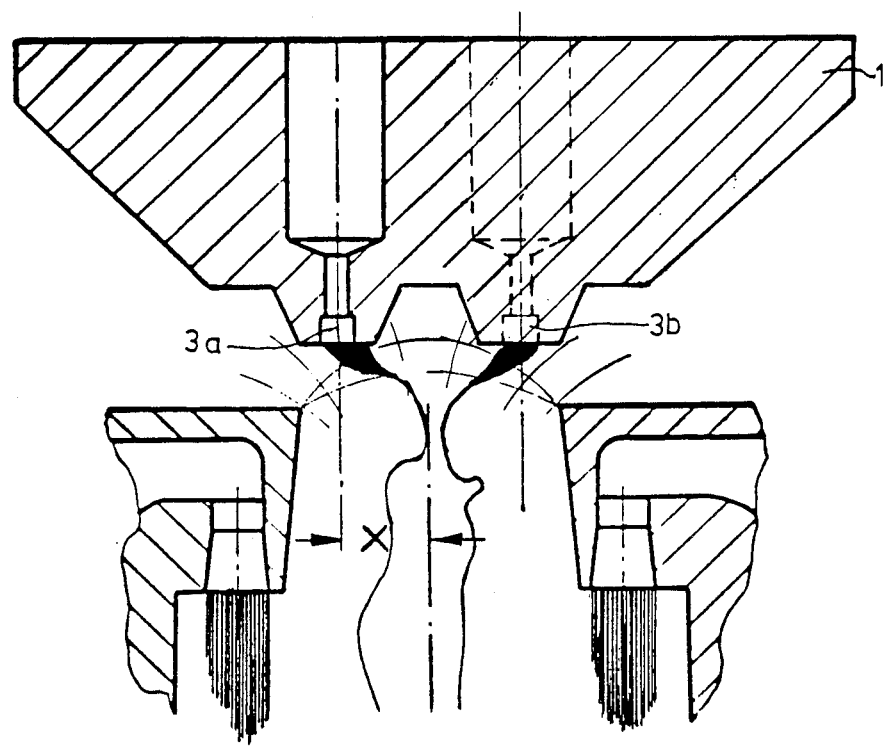
FIG. 7
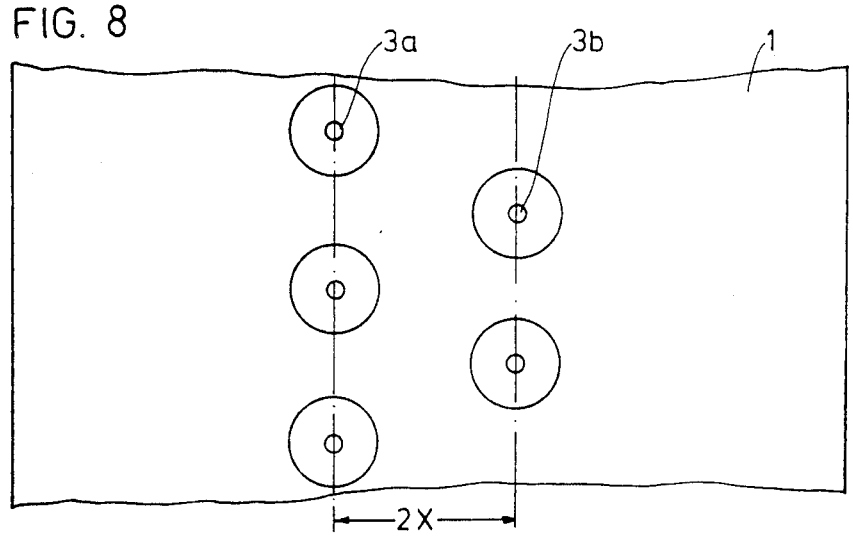

APPARATUS FOR THE PRODUCTION OF FINE MINERAL FIBERS

BACKGROUND OF THE INVENTION

The invention relates to an apparatus for the production of fine mineral fibers, in particular glass fibers and diabase fibres by the nozzle blast process. Apparatus of this type comprise a melt crucible with a number of outlet openings from which primary filaments issue and are separated into fibers in a converging/diverging draw nozzle by means of a blowing medium sucked into the draw nozzle. A subsonic diffuser for reducing the flow rate is then connected to the diverging portion of the draw nozzle.

The nozzle blast process is characterized in that melt streams flow out of a crucible containing the mineral melts under the influence of gravity and are separated into fibers in a draw nozzle under the influence of gas flowing at a high flow rate substantially parallel to the melt streams, are extracted and cooled below the softening temperature. This is in principle a very old process which has already been described in German Pat. Nos. 694 182 and 803 925. More recently, the nozzle blast process has been further developed and refined (see EP No. 66 506 and EP No. 38 989).

The diameter of the fibres produced by the nozzle blast process are generally of the order of a few $\mu m$. Problems arise if fibers having a diameter smaller than 1 $\mu m$ are to be produced. Tests on conventional apparatuses to obtain finer and finer fibres by adjusting the operating parameters have not yet led to the desired result. Instability (frequent tearing of fibres and occurrence of beads of melt) is observed and this leads to an irregular product which cannot be tolerated. The invention starts from here.

SUMMARY OF THE INVENTION

The object of the invention is to develop an apparatus operating by the nozzle blast process for the production of mineral fibers having a diameter of between 0.1 $\mu m$ and 5 $\mu m$ with a diameter distribution which is as narrow as possible i.e. a minimum content of fibers having a diameter other than the desired diameter. This object is achieved according to the invention with the apparatus described at the outset by the following features:

(a) The diameter of the crucible outlet openings is from 0.2 to 1.5 mm, preferably from 0.3 to 0.8 mm.

(b) In the region of the crucible outlet openings, the primary filaments are grasped by the blowing medium with a markedly turbulent flow at a high flow rate, the transverse component of the flow decreasing in favor of the longitudinal component as the axial distance from the outlet openings increases.

(c) The draw nozzle has an inlet portion which ends outwards with sharp edges and widens in the direction of flow.

(d) The draw nozzle is arranged with its inlet portion a short distance below the outlet openings.

(e) The length of the widening inlet portion is from 2.5 to 9 mm, preferably from 2.5 to 4 mm.

(f) The flow rate of the blast medium is from 400 m/sec to 600 m/sec at a pressure of from 0.1 bar to 0.4 bar at the end of the inlet portion, this pressure remaining constant over a subsequent portion of from 30 to 100 mm.

Preferred embodiments of the invention are described hereinafter. Very fine mineral fiber fleeces having a fiber diameter of between 0.1 $\mu m$ and 5 $\mu m$, preferably between 0.1 $\mu m$ and 2 $\mu m$ can be produced using the apparatus according to the invention. It has been found that the apparatus can operate without interruption over a prolonged period and produces a uniform product. The term "uniformity" means that the fibers predominantly have a uniform diameter and that no beads occur. A further advantage resides in the fact that it is possible to produce fine mineral fibers in a manner which is more economical than the formerly known processes.

It is clear that outlet openings which are as small as possible have to be used for producing fine fibers in order to produce from the outset primary filaments with a starting diameter which is as small as possible which are then separated into further fibers in the draw nozzle. However, the problem arises that primary filaments with such a small diameter frequently tear and droplets or beads occur. The production of coherent fine primary filaments is only successful due to the combined effect of the measures described above. The primary filaments are blown at as high air speed in the region of the crucible outlet openings and are exposed to a strong pressure gradient in the longitudinal direction up to the entrance into the inlet portion. The sharp-edged inlet in conjunction with the short distance between the upper edge of the nozzle inlet and the outlet openings causes the high pressure gradient which increases towards the edge. The short inlet portion (length from 2.5 to 9 mm) also contributes to the marked increase in the pressure gradient towards the edge. Finally, feature (f) states that inside the draw nozzle and connected to the inlet portion there is a zone having a nozzle plateau which is as long as possible in the ultrasonic flow region in which the primary filaments which are already very thin in themselves are drawn further to the desired final diameter.

The invention is described in more detail below with reference to drawings and embodiments.

BRIEF DESCRIPTION OF THE DRAWINGS

FIG. 7 shows an inlet portion with a melt crucible which has two rows of outlet openings offset laterally to each other.

FIG. 8 shows the arrangement of the outlet openings (plan view) with the melt crucible according to FIG. 7.

DETAILED DESCRIPTION OF THE INVENTION

Figure 1:
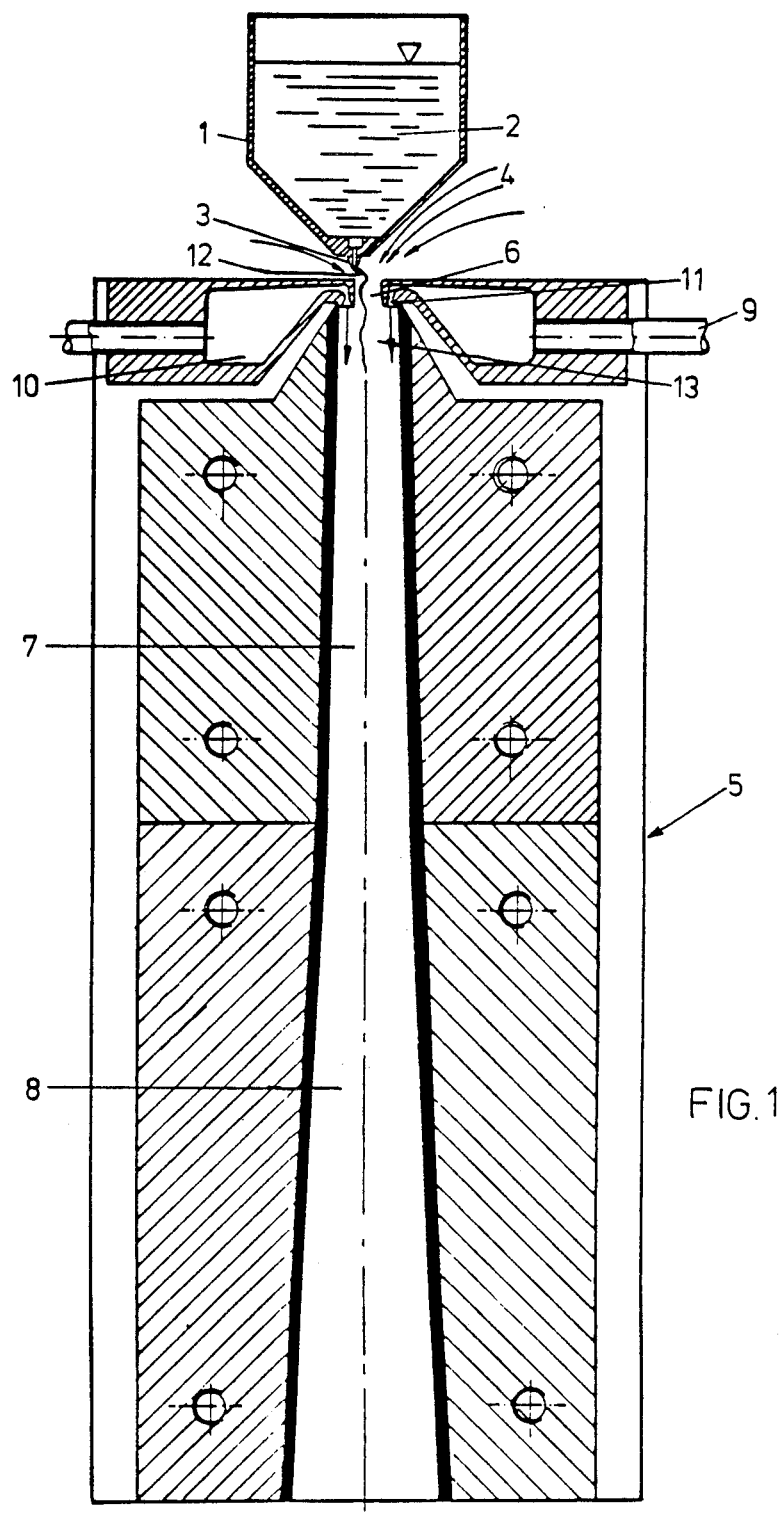
FIG. 1 shows the apparatus according to the invention with melt crucible and draw nozzle in an elevation.

According to FIG. 1, a mineral melt 2, for example, a glass or diabase melt is located in an electrically heated platinum crucible 1. The strand of melt issuing from the outlet opening 3 at the base of the crucible 1 forms a primary filament 12 which is grasped by the blowing medium 4 (environmental air) and sucked into the draw nozzle 5. The draw nozzle 5 comprises an inlet portion 6, a fibre extraction portion 7 and an adjacent subsonic diffuser 8. The whole nozzle duct has a rectangular cross section in this case. The inlet portion 6 ends with a sharp edge on the crucible side and has a length of from 2.5 to 9 mm, preferably from 2.5 to 4 mm. The distance between the outlet opening 3 in the crucible 1 and the upper edge of the inlet portion 6 is from 0.3 to 4 mm, preferably from 0.5 to 2 mm. The diameter of the outlet openings 3 is between 0.2 and 1.5 mm, preferably between 0.3 and 0.8 mm.

A propellent, for example air or steam is blown via the connection 9 in conventional manner through the propellant chambers 10 and the Laval nozzles 11 at ultrasonic speed into the fibre extraction portion 7. The fibres issuing at the lower end of the draw nozzle 5 are deposited in the form of a fleece on a conveyor belt (not shown).

It has been found that the flow ratio between crucible 1 and draw nozzle 5 and in the inlet portion 6 and the subsequent separating portion 7 are of great importance for the production of fine fibers having a narrow diameter distribution. A pressure gradient which is as high as possible and increases towards the edges should prevail between crucible 1 and upper edge of the inlet portion 6 (z=longitudinal direction). In the comparison with known apparatuses, the extremely short distance between underside of crucible and upper edge of the draw nozzle 5 as well as the sharp edge inlet portion 6 is decisive. As a result of this arrangement, a flow profile is adjusted at the entrance into the draw nozzle 5, which flow profile has immediately at the outlet openings 3 a relatively strong transverse component which decreases towards the inlet portion 6 in favour of the longitudinal component. This means that the primary filament 12 issuing from the nipple 3 is exposed to a transverse stream and at the same time to a very strong pressure gradient, causing the primary filament 12 to be fanned out more markedly above the draw nozzle 5 into thinner starting filaments. The fibers thus formed are then drawn out further in the separating portion 7. The pressure distribution in the separating portion 7 plays an important part in the formation of fibers having diameters which are as uniform as possible. The flow is controlled by means of the streams of propellant in such a way that the flow rate of the blowing medium at the end of the inlet portion between 400 m/sec and 600 m/sec, the pressure being from 0.1 to 0.4 bar. This pressure now remains constant over the following portion of from 30 to 100 mm so that a relatively long nozzle plateau at constant pressure is present in the ultrasonic region of the draw nozzle. Only slight mixing of the sucked in blowing medium with the propellent takes place in this zone.

Figure 2:
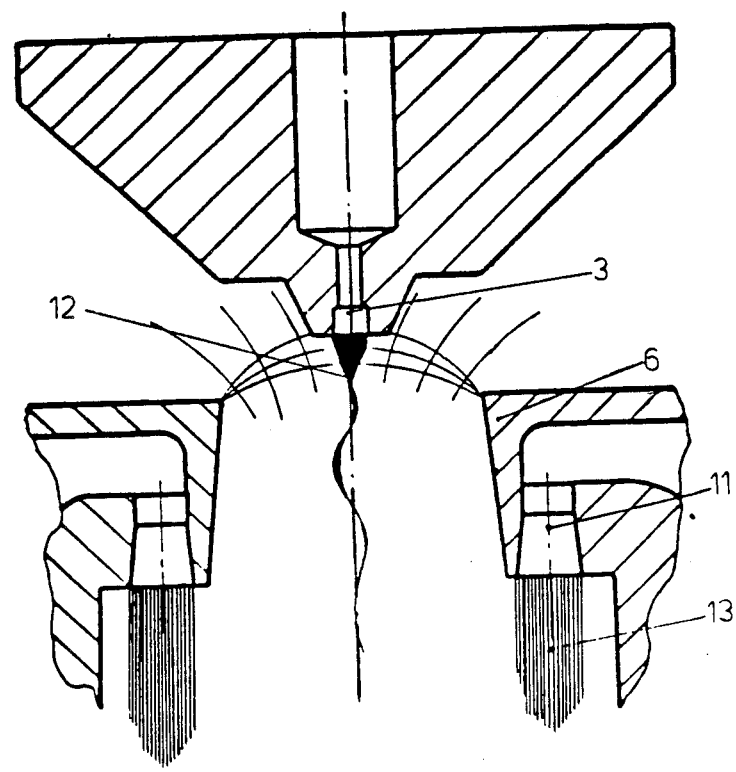
FIG. 2 shows the inlet portion of the draw nozzle with a melt crucible arranged axially symmetricallly over it.

FIG. 2 shows the nozzle inlet as an enlarged section. Whereas the crucible 1 is laterally offset from the nozzle axis in the apparatus according to FIG. 1, the outlet opening 3 coincides with the nozzle axis in the apparatus according to FIG. 2. In FIG. 2, the pressure profile at the nozzle inlet and the Laval nozzles 11 with the propellant streams 13 can be seen particularly clearly. The flow field is symmetrical to the axis in the arrangement according to FIG. 2. On the other hand, the flow at the inlet in the apparatus according to FIG. 1 has such a strong transverse component that the primary filament 12 is blown away to the side.

Figure 3:
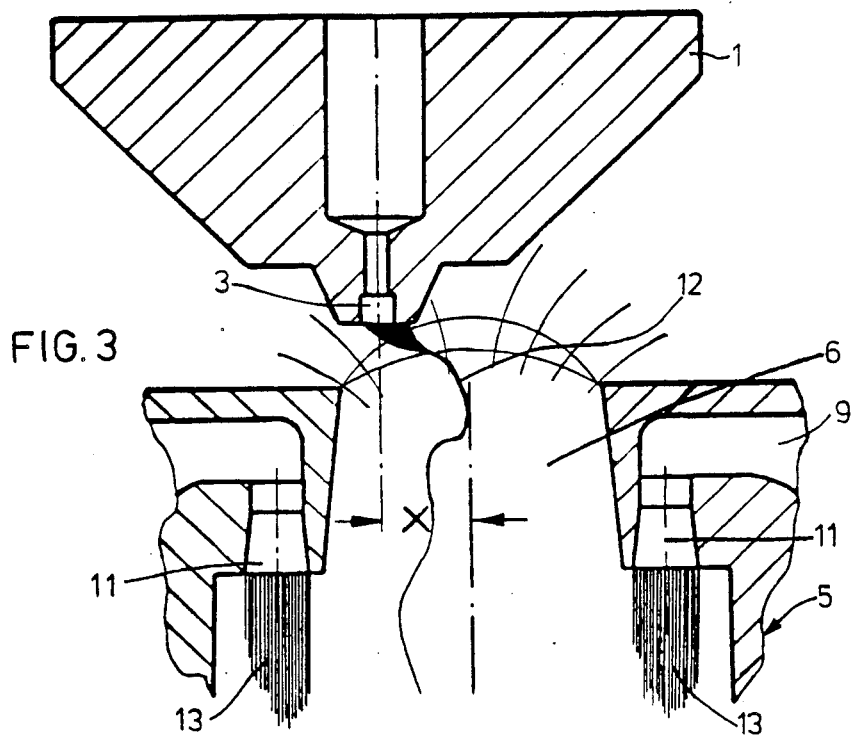
FIG. 3 and FIG. 4 show the inlet portion with a laterally offset melt crucible.
Figure 4:
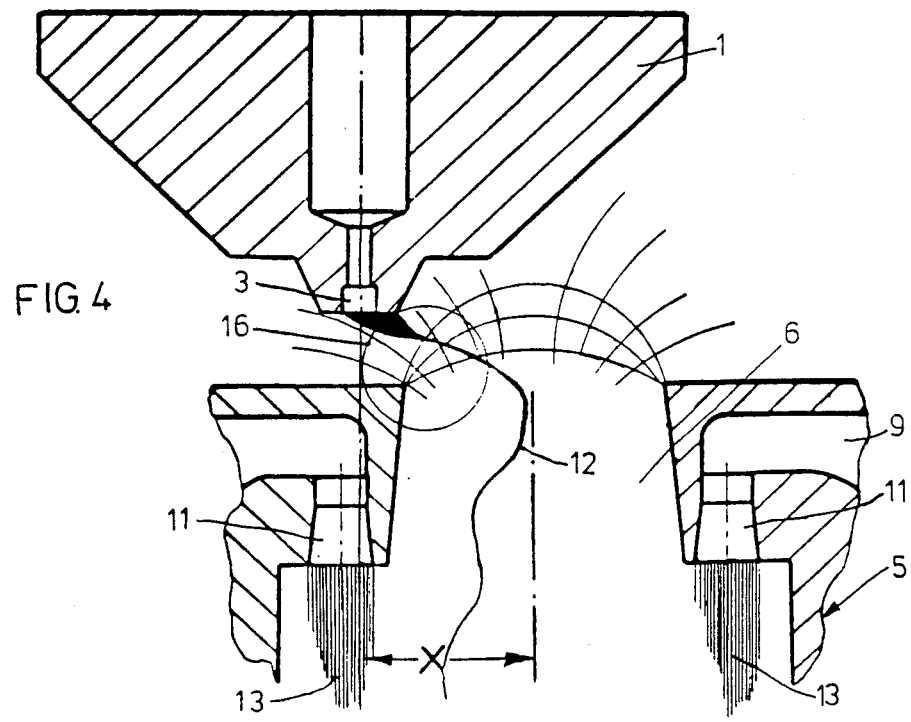

FIGS. 3 and 4 again correspond to an enlarged detail from FIG. 1. The crucible outlet openings 3 are laterally offset from the nozzle axis in both cases (to different extents). When comparing the flow fields in FIGS. 3 and 4, it is seen that the transverse component of the flow is more strongly pronounced, the greater the lateral offsetting. A stronger transverse flow of the primary filaments and therefore finer separation takes place before the entrance into the draw nozzle.

Figure 5:
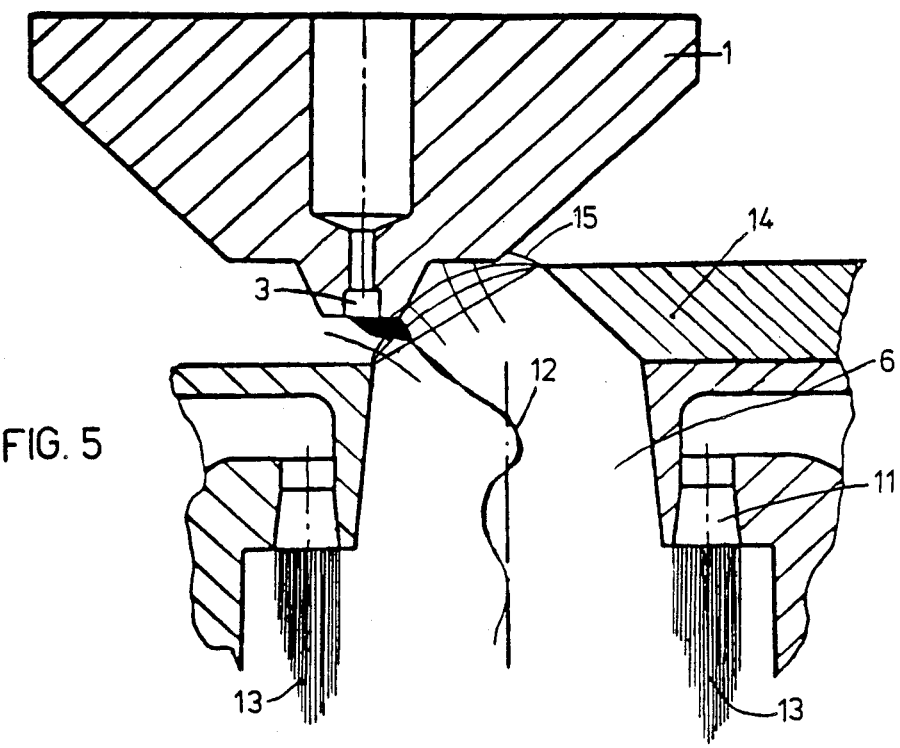
FIG. 5 shows the inlet portion with a laterally offset melt crucible and fittings for influencing the flow at the inlet portion in a symmetrical manner.
Figure 6:
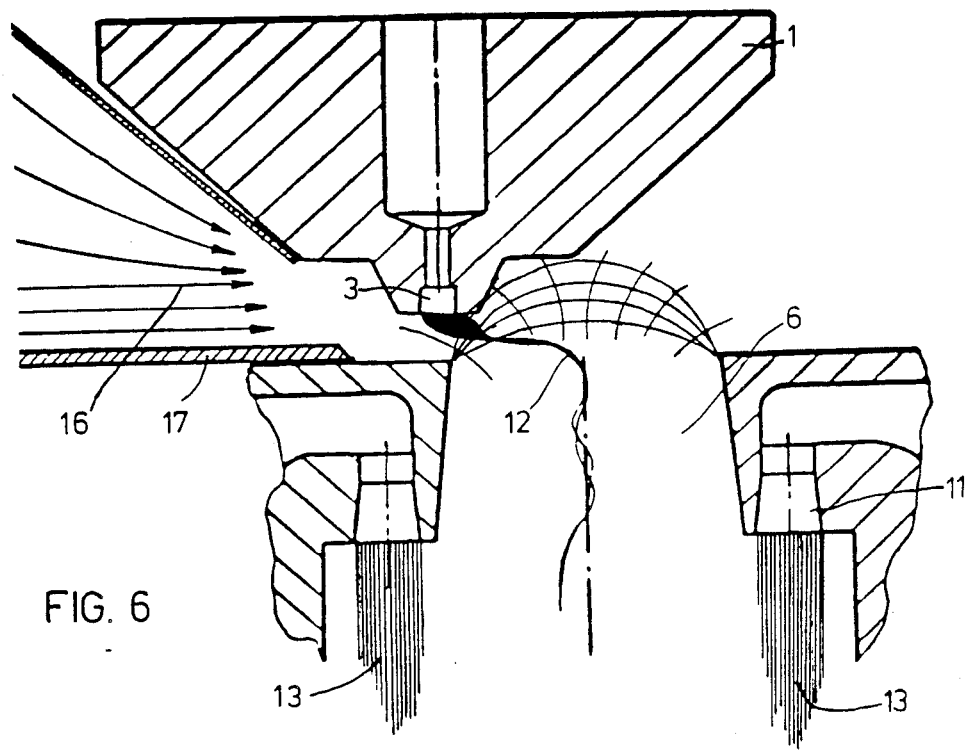
FIG. 6 shows the inlet portion with a laterally offset melt crucible and lateral supply of a hot gas stream.

According to FIG. 5, even more pronounced asymmetry of the flow at the nozzle inlet is pronounced by a guide member 14 which is placed on the draw nozzle 5 and causes a one-sided constriction 15 in cross section between crucible 1 and draw nozzle. The degree of turbulence and the pressure gradient can thus be further increased immediately upstream of the inlet portion 6. According to a further development of the invention according to FIG. 6, a hot gas stream 16 is blown on one side of the primary filament with the laterally offset arrangement. The hot gas stream 16 is supplied through a guide duct 17. The temperature can be adjusted in the range of from 800° to 1400° C. Particularly fine fibers can be produced in this way.

In a further variation, the crucible 1 has two rows of outlet openings 3a, 3b (according to FIG. 7 and FIG. 8) which are laterally offset from the nozzle axis by the same amount (x) (see FIG. 7). Furthermore, the outlet openings 3a, 3b are arranged in a zig-zag manner, i.e. the outlet openings 3a of one row do not face the outlet openings 3b of the other row but face respective gaps (see FIG. 8). The distance between the two rows is from 0.8 to 5 mm, preferably from 1.5 to 2.5 mm. The economic viability of fibre production can be clearly improved with such an arrangement, in particular with filament diameters greater than 1 μm.

The inlet portion 6 of the draw nozzle 5, in particular in the apparatus according to FIGS. 7 and 8, has a rectangular cross section and then widens trapezoidally in the direction of the flow.

Figure 9:
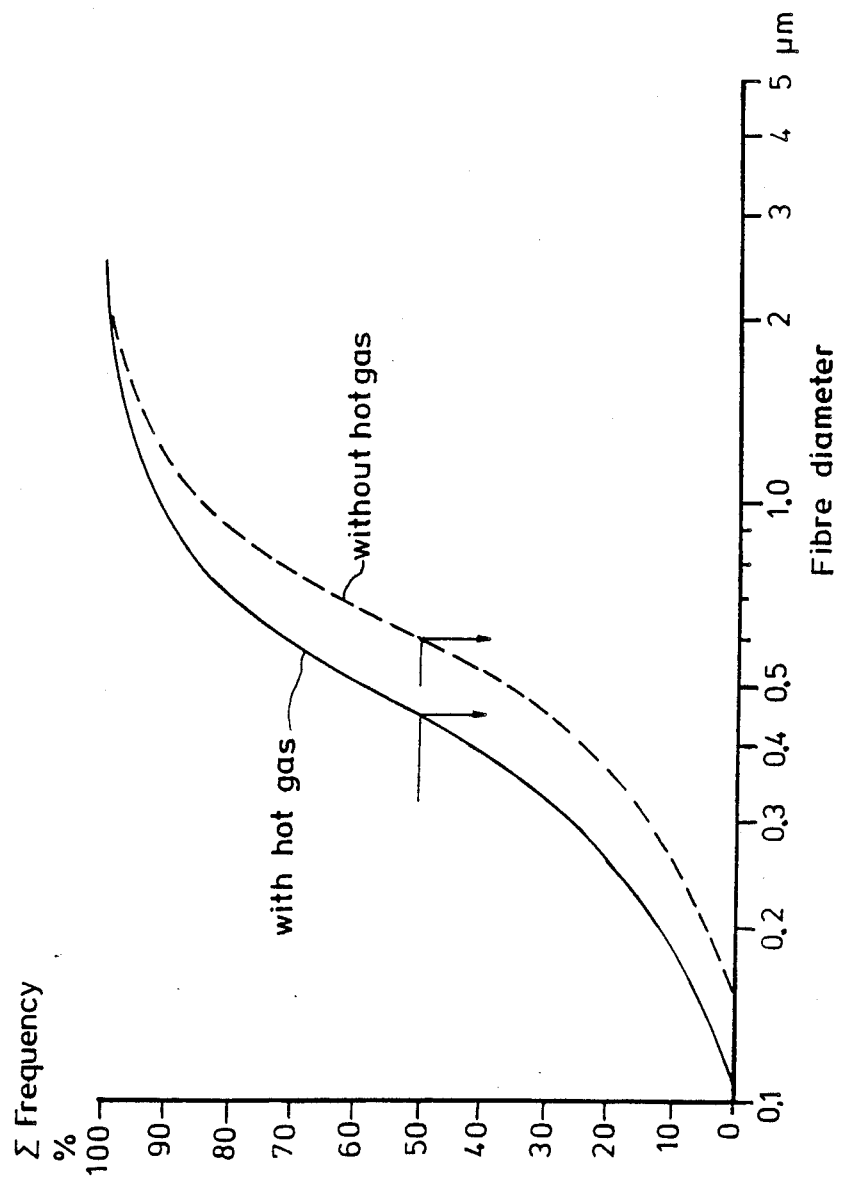
FIG. 9 shows an example of the diameter frequency distribution of a fibre charge produced using the apparatuses according to the invention.

FIG. 9 shows the diameter frequency distribution for microglass fibers which have been produced using the apparatuses described above. The cumulative frequency is plotted in percent as a function of the fiber diameter (on a logarithmic scale). The continuous curve was produced during the production of microglass fibers with an apparatus according to FIG. 6, an additional hot gas stream being blown in. The broken curve was produced without hot gas. The cumulative frequency states, for example, that 60% of the microglass fibers produced have a diameter less than 0.5 μm with the continuous curve (with hot gas) while 40% of the glass fibers have a diameter of between 0.5 μm and 2 μm in this case. The steeper the curve, the narrower the frequency distribution. Derivation of the curve produces the conventional Gauss distribution of frequency. The diameter distribution can be shifted to smaller values by blowing in hot gas between draw nozzle 5 and crucible outlet openings 3.

We claim:

1. In an apparatus for producing fine mineral fibers, in particular glass or diabase fibers by the nozzle blast process, comprising a melt crucible having a base with at least one row of outlet openings from which primary filaments issue, a converging/diverging draw nozzle receptive of a blowing medium for sucking primary filaments into the draw nozzle and a subsonic diffuser connected to the diverging portion of the draw nozzle for separating primary filaments into fibers, the improvement wherein:

(a) the diameter of each crucible outlet opening is from 0.2 mm to 1.5 mm, (b) means disposed in the region of the crucible outlet opening to effect the grasping of the primary filaments by the blowing medium with a markedly turbulent flow at a high flow rate, with the transverse component of the flow decreasing in favor of the longitudinal component as the axial distance from the outlet openings increases, (c) the draw nozzle has an inlet portion which ends outwards with a sharp edge and widens in the flow direction, (d) the draw nozzle is arranged with its inlet portion at a small distance below the outlet openings, (e) the length of the widening inlet portion is from 2.5 to 9 mm, (f) the flow rate of the blowing medium at the end of the inlet portion is from 400 m/sec to 600 m/sec at a pressure of from 0.1 bar to 0.4 bar, this pressure remaining constant over a subsequent portion of from 30 to 100 mm.

2. An apparatus according to claim 1, wherein the nozzle has a nozzle axis and the melt crucible with the outlet openings is laterally offset from the nozzle axis.

3. An apparatus according to claim 1 or claim 2, wherein the distance between the outlet openings and the upper edge of the inlet portion is from 0.3 mm to 4 mm.

4. An apparatus according to claim 1, wherein the grasping means comprises guide members which promote the transverse flow of the blowing medium and are disposed in the intake cross-section around the outlet openings.

5. An apparatus according to claim 1, further comprising a hot air duct arranged on one side between the crucible and the inlet portion of the draw nozzle.

6. An apparatus according to claim 2, wherein the crucible has two rows of outlet openings, these rows laterally offset from the nozzle axis by the same amount and the outlet openings are offset from one another relative to the outlet openings in the direction of the row.

7. The apparatus according to claim 1, wherein each crucible outlet opening has a diameter of from 0.3 mm to 0.8 mm and the length of the widening inlet portion is from 2.5 to 4 mm.

8. The apparatus according to claim 3, wherein the distance is from 0.5 to 2 mm.

* * * * *